(12) United States Patent
Cross et al.

(10) Patent No.: US 11,822,711 B2
(45) Date of Patent: *Nov. 21, 2023

(54) RECONFIGURABLE HEADSET THAT TRANSITIONS BETWEEN VIRTUAL REALITY, AUGMENTED REALITY, AND ACTUAL REALITY

(71) Applicant: Meta Platforms Technologies, LLC, Menlo Park, CA (US)

(72) Inventors: Rachel Cross, Foster City, CA (US); Tiffany Madruga, New York, NY (US); Allison Fu, San Francisco, CA (US); Meaghan Fitzgerald, Seattle, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/060,883

(22) Filed: Dec. 1, 2022

(65) Prior Publication Data

US 2023/0143799 A1 May 11, 2023

Related U.S. Application Data

(63) Continuation of application No. 17/521,455, filed on Nov. 8, 2021, now Pat. No. 11,537,198.

(51) Int. Cl.
*G06F 3/01* (2006.01)
*G06V 20/20* (2022.01)

(52) U.S. Cl.
CPC .............. *G06F 3/011* (2013.01); *G06V 20/20* (2022.01)

(58) Field of Classification Search
CPC ................................ G06F 3/011; G06V 20/20
USPC .......................................................... 345/156
See application file for complete search history.

(56) References Cited

U.S. PATENT DOCUMENTS

2017/0345215 A1* 11/2017 Khedkar .................. G06F 3/011
2020/0310134 A1* 10/2020 Figueroa ............... G06T 19/006

FOREIGN PATENT DOCUMENTS

| CN | 111103688 A | 5/2020 |
|---|---|---|
| CN | 112561113 A | 3/2021 |

\* cited by examiner

*Primary Examiner* — Mark Edwards
(74) *Attorney, Agent, or Firm* — McDermott Will & Emery LLP (57) ABSTRACT

A method for switching a configuration of an enhanced reality headset is provided. The method includes identifying a scenario to switch a configuration of an enhanced reality headset between a virtual reality configuration, an augmented reality configuration, and a direct reality configuration, wherein the virtual reality configuration and the augmented reality configuration include a computer generated image, and the direct reality configuration and the augmented reality configuration include a real-time image of an environment of a user of the enhanced reality headset. The method includes providing a notification to a user of the enhanced reality headset including an intent to switch the configuration of the enhanced reality headset, and switching the configuration of the enhanced reality headset according to the scenario.

20 Claims, 5 Drawing Sheets

RECONFIGURABLE HEADSET THAT TRANSITIONS BETWEEN VIRTUAL REALITY, AUGMENTED REALITY, AND ACTUAL REALITY

CROSS-REFERENCE TO RELATED APPLICATIONS

The present disclosure relates and claims priority under 35 U.S.C. § 120 as a continuation application to U.S. Ser. No. 17/521,455, to Rachel CROSS et-al., filed on Nov. 8, 2021, the contents of which are hereby incorporated by reference in their entirety, for all purposes.

BACKGROUND

Field

The present disclosure relates to enhanced reality headsets with automatic or manual switchable configuration. More specifically, the present disclosure relates to enhanced reality headsets that can switch between a virtual reality (VR) configuration, an augmented reality (AR) configuration, and a direct reality (DR or "see-through") configuration upon a user request, or an automated prompt based on emergency or other environmental circumstances.

Related Art

Current devices and applications for enhanced reality make a clear distinction between VR and AR modes of operation. In many instances, and due to the complexity of VR devices, these two configuration modes are associated with specifically devoted devices. However, for user of VR devices, it is beneficial to have some degree of contact with their real environment, for safety, for comfort, or even to maximize the sharing experience of immersed reality. On the other hand, users of AR devices and applications may desire at least momentarily to have a full virtual world experience. However, the transition between these different configurations within a single device is challenging given the complexity of each configuration mode and the associated hardware.

BRIEF DESCRIPTION OF THE DRAWINGS

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

In the figures, like reference numerals refer to features and elements having like descriptions, except when indicated otherwise.

SUMMARY

In a first embodiment, a computer-implemented method includes identifying a scenario to switch a configuration of an enhanced reality headset between a virtual reality configuration, an augmented reality configuration, and a direct reality configuration, wherein the virtual reality configuration and the augmented reality configuration include a computer generated image, and the direct reality configuration and the augmented reality configuration include a real-time image of an environment of a user of the enhanced reality headset. The computer-implemented method includes providing a notification to a user of the enhanced reality headset, the notification including an intent to switch the configuration of the enhanced reality headset, and switching the configuration of the enhanced reality headset according to the scenario.

In a second embodiment, a system includes one or more processors and a memory storing instructions which, when executed by the one or more processors, cause the system to execute operations. The operations include to identify a scenario to switch a configuration of an enhanced reality headset between a virtual reality configuration, an augmented reality configuration, and a direct reality configuration, wherein the virtual reality configuration and the augmented reality configuration include a computer generated image, and the direct reality configuration and the augmented reality configuration include a real-time image of an environment of a user of the enhanced reality headset. The operations also include to provide a notification to a user of the enhanced reality headset, the notification including an intent to switch the configuration of the enhanced reality headset, and to switch the configuration of the enhanced reality headset according to the scenario, wherein to identify the scenario to switch the configuration the one or more processors execute instructions to capture an image of an environment of the user of the enhanced reality headset and identifying a potential hazard to the user from the image of the environment.

In a third embodiment, a non-transitory, computer-readable medium storing instructions which, when executed by a processor cause a computer to execute a method. The method includes capturing an image of an environment of a user of an enhanced reality headset and identifying a potential hazard to the user from the image of the environment, capturing an audio of an environment of the user of the enhanced reality headset and identifying an alert to the user from the audio of the environment, and identifying a scenario to switch a configuration of an enhanced reality headset between a virtual reality configuration, an augmented reality configuration, and a direct reality configuration. The method also includes providing a notification to a user of the enhanced reality headset, the notification including an intent to switch the configuration of the enhanced reality headset, and switching the configuration of the enhanced reality headset according to the scenario.

In a fourth embodiment, a system includes a first means to store instructions, and a second means to execute the instructions and cause the system to execute a method. The method includes identifying a scenario to switch a configuration of an enhanced reality headset between a virtual reality configuration and an augmented reality configuration, providing a notification to a user of the enhanced reality headset including an intent to switch the configuration of the enhanced reality headset, and switching the configuration of the enhanced reality headset according to the scenario.

DETAILED DESCRIPTION OF THE DRAWINGS

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

Current trends in social networks include mixed reality applications, rather than purely VR. In some configurations, the hardware desirably worn for extensive periods of time (e.g., all day), and other AR experiences are seamlessly integrated with the real world. Accordingly, some embodiments include an option to switch from mixed reality to VR to real life while wearing the headset. Similarly to noise cancelling, embodiments as disclosed herein include vision cancelling devices so that users are transported directly into a virtual/real world without having to remove their head mounted device. Accordingly, embodiments as disclosed herein provide a seamless transition experience between reality, augmented reality, and virtual reality. In some embodiments, a noise cancelling audio system sound produced by noise or background sources is shifted exactly out of phase with each other to create a cancelling effect. Similarly with headsets as disclosed herein, there could be some form of active or selectable optical manipulation or fading effect that blocks out images from a direct reality from the user. Accordingly, the user may choose to only see the virtual reality through the headset. This effectively transitions the user from a direct reality or an augmented reality to a purely virtual reality. The optical manipulation may include a polarizing effect, there the image collected by the headset from the direct reality is made to pass through two orthogonal polarizers, polarization rotation devices, or phase shifting devices, at least one of them being electrically activated. In some embodiments, the optical manipulation may include activating a planar waveguide in the headset via adjusting the index of refraction of at least one of the layers in the planar waveguide, so that a direct reality image is transmitted through or decoupled out of, the planar waveguide to the user.

Devices as disclosed herein easily switch between virtual and real world and enhances the interaction of the user with the real life (e.g., friends, family, and co-workers). Devices as disclosed herein also provide the flexibility to become a "real life companion" directly into the user's virtual world seamlessly. In some embodiments, the transition from one configuration (VR) to a different configuration (AR) may include a simple gesture (e.g., a finger move, a head move).

Embodiments as disclosed herein enable people in the environment to interact with a VR user through pass through and an external display on the VR headset. Some embodiments include updating the VR configuration based on the real world external to the headset. For example, some embodiments overlay a portion of the outside world into the VR world. In some embodiments, a user may be immersed into a VR world, and transitions seamlessly into the real world from going through an infinite space to a real (e.g., smaller) one. Enhanced reality headsets have improved significantly. Headsets are lightweight and have long battery life (e.g., 8-12 hours) and can be used for extended periods of time in different circumstances.

Figure 1:
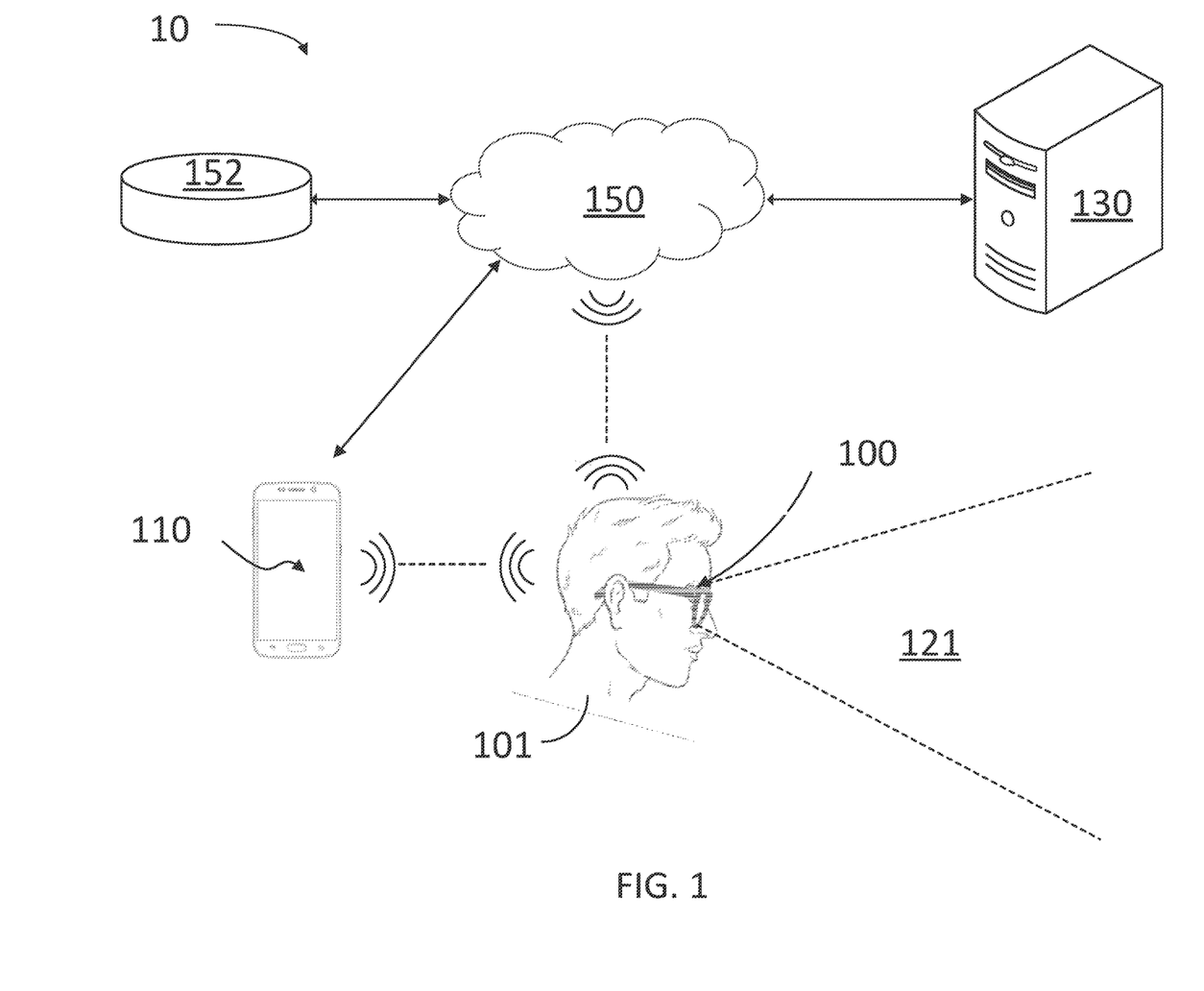
FIG. 1 illustrates a network architecture for an enhanced reality headset, according to some embodiments.

FIG. 1 illustrates a network architecture 10 for an enhanced reality headset 100, according to some embodiments. A user 101 of enhanced reality headset 100 may use it in an AR or DR configuration to watch at least part of a scene in a forward field of view (fFOV) 121. Enhanced reality headset 100 may be a smart glass, or a visual headset, and may include circuitry to communicatively couple with a mobile device 110 or a network 150. Network 150 can include, for example, any one or more of a LAN, a WAN, the Internet, and the like. Further, network 150 can include, but is not limited to, for example, any one or more of the following network topologies, including a bus network, a star network, a ring network, a mesh network, a star-bus network, tree or hierarchical network, or the like. Through network 150, enhanced reality headset 100 may receive and provide data to a remote server 130 and to a database 152. Remote server 130, database 152, and mobile device 110 may be also communicatively coupled with each other via network 150.

Figure 2:
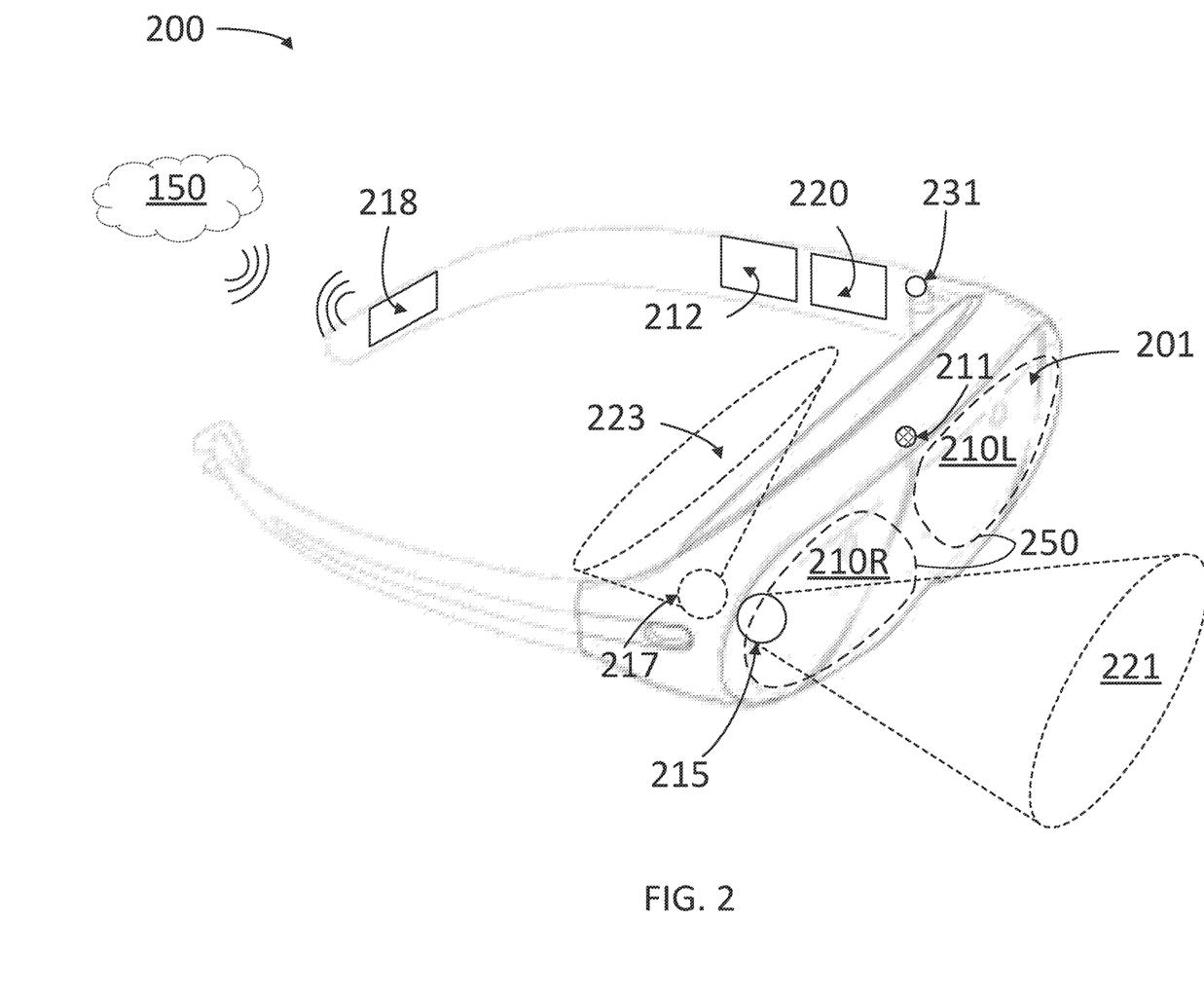
FIG. 2 illustrates a headset for an enhanced reality headset, according to some embodiments.

FIG. 2 illustrates a headset 200 for enhanced reality applications, according to some embodiments. Headset 200 may include a display 201 to provide images for the user, and a microphone/speaker 211 to provide to, and receive audio from, the user and/or the environment. Headset 200 may also include a front view camera 215 to provide an fFOV 221 for the user, and a rear view camera 217 to collect a back FOV (bFOV) 223 of the user. In some embodiments, rear view camera 217 may collect a partial image (e.g., infra-red, and the like) of a portion of the user's face including the user's eye and pupil. Accordingly, bFOV 223 may be used to determine a pupil location, a gaze direction, and an area of interest for the user, within display 201.

The processing of fFOV 221 and bFOV 223 may occur by a processor circuit 212 executing instructions stored in a memory circuit 220. Furthermore, processor circuit 212 may provide images to display 201 according to instructions stored in memory circuit 220. The images provided to display 201 may be transmitted to a mobile device or remote server (e.g., mobile device 110 and remote server 130) via a communications module 218, for further analysis or storage. In some embodiments, communications module 218 may download images, video, audio, and other multimedia data from the remote server, via network 150. Accordingly, in a VR configuration, processor circuit 212 may provide synthetic images, or computer-generated images, to display 201.

In some embodiments, display 201 may also include eyepieces 210L and 210R (hereinafter, collectively referred to as "eyepieces 210") configured to optically transmit fFOV 221 to the user. Accordingly, eyepieces may include a transparent optical element, such as a lens, a prism, a waveguide, and the like, or any combination thereof. Accordingly, in a DR configuration, display 201 may be configured to allow eyepieces 210 to transmit a direct image from fFOV 221 to the user. To achieve this, display 201 may be configured to turn "off" a pixel array coupled with processor circuit 212 to block computer generated images to display 201. Furthermore, in some embodiments, eyepieces 210 may include a dimming element 250 controlled by processor circuit 212 to reduce optical transmission as desired. Accordingly, when the device is set in a VR configuration, dimming element 250 may reduce the optical transmission of eyepieces to a minimum (e.g., 0%, 10%, and the like), so that the user may focus on computer-generated images on display 201 without interference by direct images from fFOV 221. In some embodiments, dimming element 250 may include a liquid crystal medium configured to display optical birefringence between two polarization plates, upon activating an electric field across a pair of electrodes. In some embodiments, dimming element 250 is a pixelated device configured to dim or make transparent a selected portion of either one of eyepieces 210. Likewise, when the device is in an AR configuration, dimming element 250 may provide a degree of transparency to at least some portions of eyepieces 210 such that direct images from fFOV 221 are visible to the user, and a degree of opacity to at least some portions of eyepieces 210 such that computer-generated images from processor circuit 212 are visible to the user in display 201.

Additionally, in some embodiments, headset 200 may include one or more sensors 231 for determining a GPS location as well as to help determine a 3D position of headset 200 relative to the user's eyes and face (e.g., user 101). Accordingly, sensors 231 may include accelerometers, gyroscopes, and other inertial measurement units (IMUs). More generally, sensors 231 may be configured to detect a user gesture (e.g., a head node, or shake, a finger swipe or tap, and the like). In some embodiments, front view camera 215 may be configured to capture a hand gesture by the user, and processor circuit 212 may execute instructions stored in memory circuit 220 to read and interpret the hand gesture from the user in terms of a desirability to switch a configuration of headset 200 (e.g., between any of a VR mode, an AR mode or a DR mode).

Figure 3:
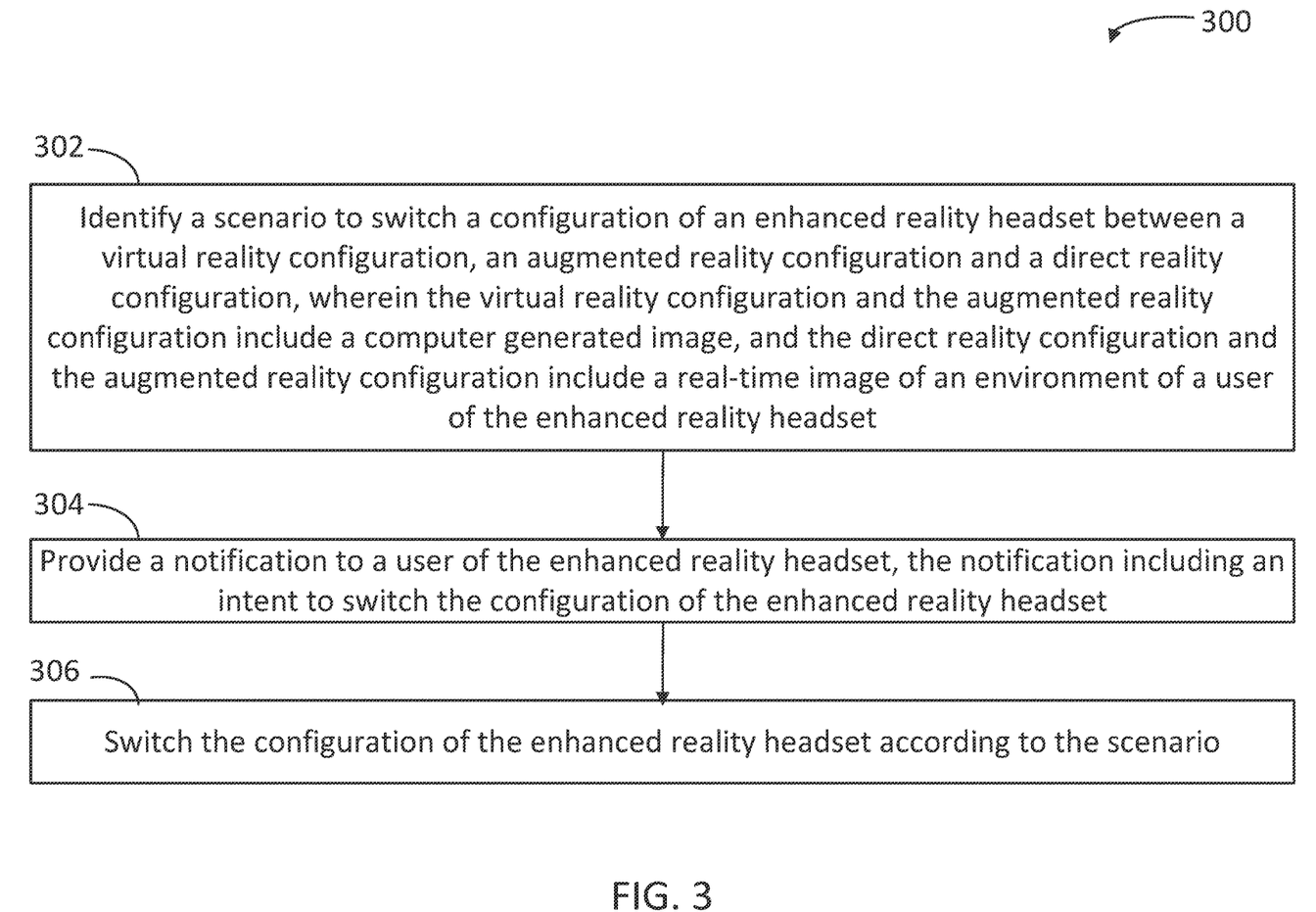
FIG. 3 is a flowchart illustrating steps in a method for switching a configuration of an enhanced reality headset, according to some embodiments.

FIG. 3 is a flowchart illustrating steps in a method 300 for switching a configuration of an enhanced reality device, according to some embodiments. The enhanced reality device may include a headset, as disclosed herein (cf. headsets 100 and 200). Method 300 may be at least partially performed by a processor circuit in the headset, executing instructions stored in a memory circuit in the headset (cf. processor circuit 212 and memory circuit 220). In some embodiments, at least one or more of the steps in method 300 may be partially performed by a processor circuit executing instructions stored in a memory circuit wherein the processor circuit, the memory circuit, or both may be in one of a mobile device, a server, or a database communicatively coupled with the headset via a network (cf. mobile device 110, remote server 130, database 152, and network 150). Methods consistent with the present disclosure may include one or more steps in method 300 performed in a different order, simultaneously, quasi-simultaneously, or overlapping in time.

Step 302 includes identifying a scenario to switch a configuration of an enhanced reality headset between a virtual reality configuration, an augmented reality configuration, and a direct reality configuration, wherein the virtual reality configuration and the augmented reality configuration include a computer generated image, and the direct reality configuration and the augmented reality configuration include a real-time image of an environment of a user of the enhanced reality headset. In some embodiments, step 302 includes capturing an image of an environment of the user of the enhanced reality headset and identifying a potential hazard to the user from the image of the environment. In some embodiments, step 302 includes capturing an audio of an environment of the user of the enhanced reality headset and identifying an alert to the user from the audio of the environment. In some embodiments, step 302 includes determining that a period of time has lapsed without an alert or a potential hazard to the user has been identified, and selecting an intent to switch from an augmented reality configuration to a virtual reality configuration. In some embodiments, the enhanced reality headset comprises multiple inertial motion sensors, and step 302 includes identifying a signal pattern from the inertial motion sensors, the signal pattern being indicative of a potential hazard to the user.

Step 304 includes providing a notification to a user of the enhanced reality headset, the notification including an intent to switch the configuration of the enhanced reality headset. In some embodiments, step 304 includes providing a through-video image in a portion of a display in the enhanced reality headset, for the user.

Step 306 includes switching the configuration of the enhanced reality headset according to the scenario. In some embodiments, step 306 includes receiving, from the user, a validation of the intent to switch the configuration of the enhanced reality headset. In some embodiments, the enhanced reality headset is configured to provide a through-video image in a portion of a display for the user, and a button for the user to select between the virtual reality configuration, the augmented reality configuration, and the direct reality configuration, and step 306 includes switching the enhanced reality headset per a user selection of the button.

In some embodiments, step 306 includes providing, to a remote device communicatively coupled with the enhanced reality headset, an indication that the configuration of the headset has been switched. In some embodiments, step 306 includes providing an avatar of the user to a remote device communicatively coupled with the enhanced reality headset when the configuration has been switched to a virtual reality configuration.

Figure 4:
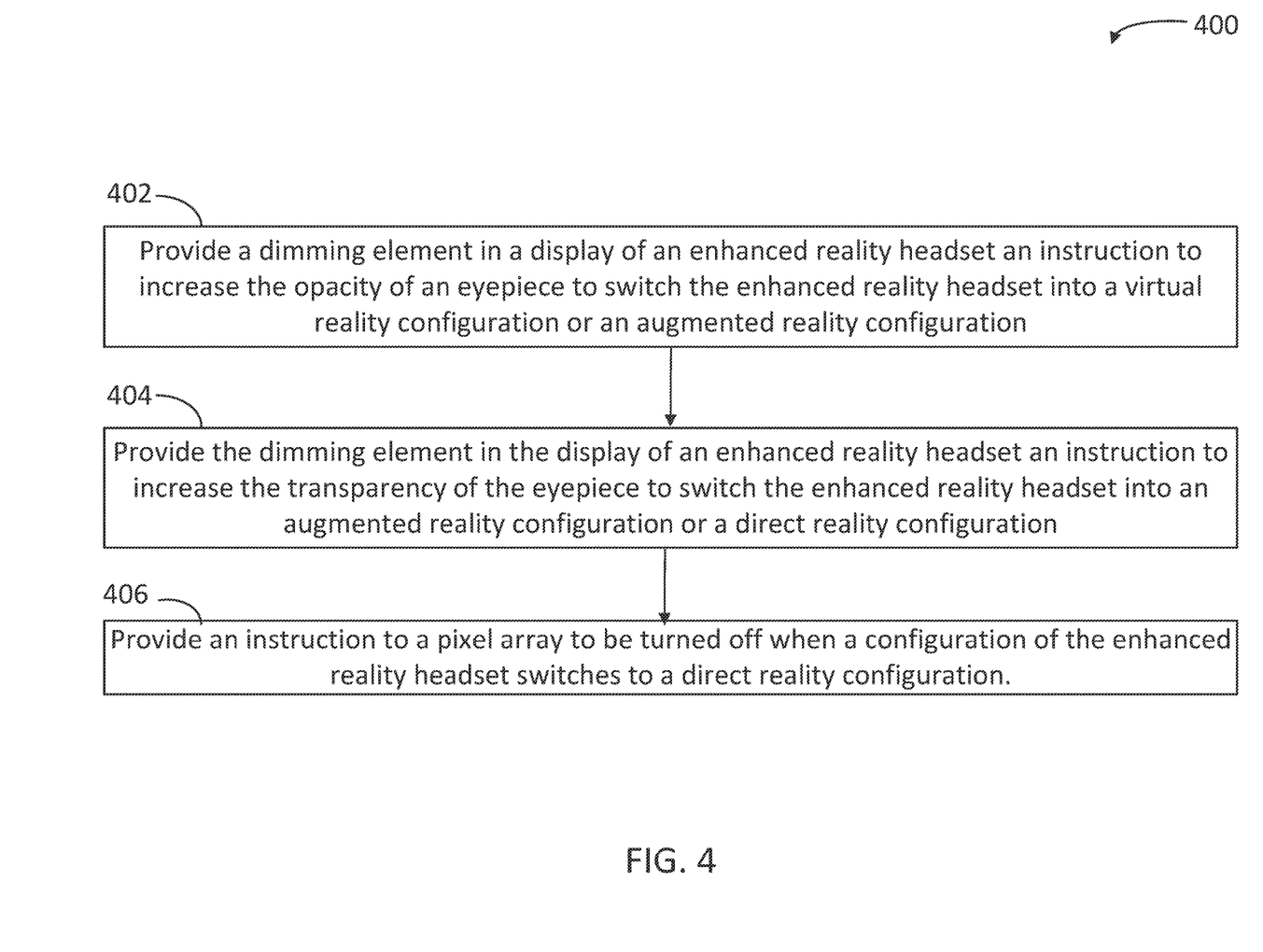
FIG. 4 is a flowchart illustrating steps in a method for switching a hardware configuration of an enhanced reality headset, according to some embodiments.

FIG. 4 is a flowchart illustrating steps in a method 400 for switching a configuration of an enhanced reality device, according to some embodiments. The enhanced reality device may include a headset, as disclosed herein (cf. headsets 100 and 200). Accordingly, the enhanced reality device may include a display, left and right eyepieces, and a dimming element configured to adjust the transparency of the eyepieces (cf. display 201, eyepieces 210, and dimming element 250). Method 400 may be at least partially performed by a processor circuit in the headset, executing instructions stored in a memory circuit in the headset (cf processor circuit 212 and memory circuit 220). In some embodiments, at least one or more of the steps in method 400 may be partially performed by a processor circuit executing instructions stored in a memory circuit wherein the processor circuit, the memory circuit, or both may be in one of a mobile device, a server, or a database communicatively coupled with the headset via a network (cf. mobile device 110, remote server 130, database 152, and network 150). Methods consistent with the present disclosure may include one or more steps in method 400 performed in a different order, simultaneously, quasi-simultaneously, or overlapping in time.

Step 402 includes providing the dimming element in the display of the enhanced reality device an instruction to increase the opacity of the eyepiece to switch the enhanced reality headset into a virtual reality configuration or an augmented reality configuration.

Step 404 includes providing the dimming element in the display of the enhanced reality headset an instruction to increase the transparency of the eyepiece to switch the enhanced reality headset into an augmented reality configuration or a direct reality configuration.

Step 406 includes providing an instruction to a pixel array to be turned off when a configuration of the enhanced reality headset switches to a direct reality configuration.

Hardware Overview

Figure 5:
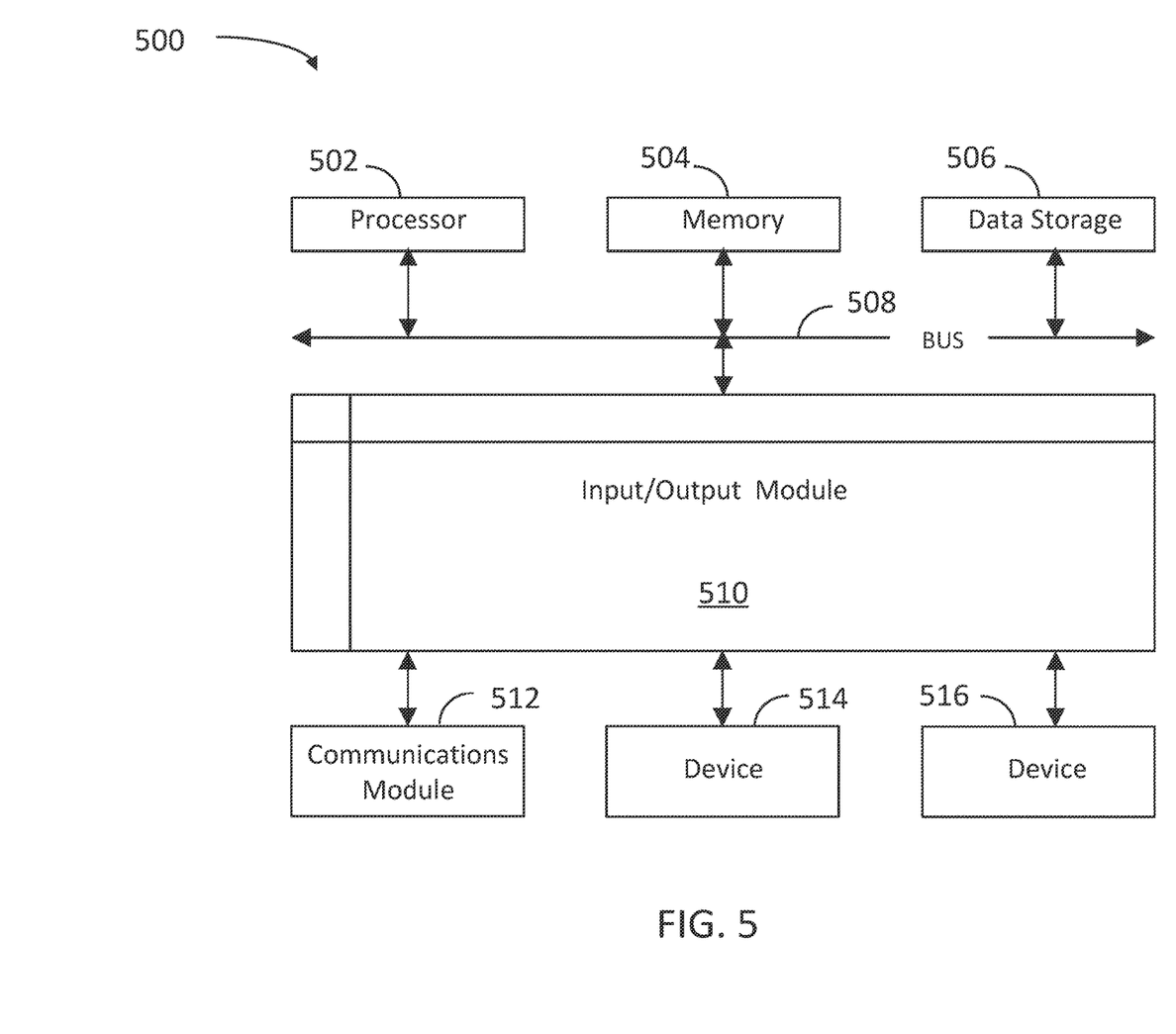
FIG. 5 is a block diagram illustrating a computer system configured to perform at least some of the steps in methods disclosed herein.

FIG. 5 is a block diagram illustrating an exemplary computer system 500 with which the devices of FIGS. 1-2 (e.g., mixed reality devices and headsets), and the methods of FIG. 3-4 can be implemented. In certain aspects, the computer system 500 may be implemented using hardware or a combination of software and hardware, either in a dedicated server, or integrated into another entity, or distributed across multiple entities.

Computer system 500 includes a bus 508 or other communication mechanism for communicating information, and a processor 502 coupled with bus 508 for processing information. By way of example, the computer system 500 may be implemented with one or more processors 502. Processor 502 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 500 can include, in addition to hardware, a code that creates an execution environment for the computer program in question, e.g., code that constitutes processor firmware, a protocol stack, a database management system, an operating system, or a combination of one or more of them stored in an included memory 504, such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 can be supplemented by, or incorporated in, a special purpose logic circuitry.

The instructions may be stored in the memory 504 and implemented in one or more computer program products, i.e., one or more modules of computer program instructions encoded on a computer-readable medium for execution by, or to control the operation of, the computer system 500, and according to any method well-known to those skilled in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 504 may also be used for storing temporary variable or other intermediate information during execution of instructions to be executed by processor 502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 500 further includes a data storage device 506 such as a magnetic disk or optical disk, coupled to bus 508 for storing information and instructions. Computer system 500 may be coupled via input/output module 510 to various devices. Input/output module 510 can be any input/output module. Exemplary input/output modules 510 include data ports such as USB ports. The input/output module 510 is configured to connect to a communications module 512. Exemplary communication modules 512 include networking interface cards, such as Ethernet cards and modems. In certain aspects, input/output module 510 is configured to connect to a plurality of devices, such as an input device 514 and/or an output device 516. Exemplary input devices 514 include a keyboard and a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Exemplary output devices 516 include display devices, such as an LCD (liquid crystal display) monitor, for displaying information to the user.

According to one aspect of the present disclosure, a headset can be implemented using a computer system 500 in response to processor 502 executing one or more sequences of one or more instructions contained in memory 504. Such instructions may be read into memory 504 from another machine-readable medium, such as data storage device 506. Execution of the sequences of instructions contained in main memory 504 causes processor 502 to perform the process steps described herein. One or more processors in a multi-processing arrangement may also be employed to execute the sequences of instructions contained in memory 504. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. The communication network can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communication modules can be, for example, modems or Ethernet cards.

Computer system 500 can include clients and servers. A client and server are generally remote from each other and typically interact through a communication network. The relationship of client and server arises by virtue of computer programs running on the respective computers and having a client-server relationship with each other. Computer system 500 can be, for example, and without limitation, a desktop computer, laptop computer, or tablet computer. Computer system 500 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to processor 502 for execution. Such a medium may take many forms, including, but not limited to, non-volatile media, volatile media, and transmission media. Non-volatile media include, for example, optical or magnetic disks, such as data storage device 506. Volatile media include dynamic memory, such as memory 504. Transmission media include coaxial cables, copper wire, and fiber optics, including the wires that include bus 508. Common forms of machine-readable media include, for example, floppy disk, flexible disk, hard disk, magnetic tape, any other magnetic medium, CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the term "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method, comprising:
   identifying a scenario to switch a configuration of an enhanced reality headset between a virtual reality configuration, and an augmented reality configuration, wherein the virtual reality configuration and the augmented reality configuration include a computer generated image, and the augmented reality configuration includes a real-time image of an environment of a user of the enhanced reality headset;
   providing an indication of an intent to switch the configuration of the enhanced reality headset;
   switching the configuration of the enhanced reality headset according to the scenario; and in response to switching the configuration, providing an avatar of the user to a remote device communicatively coupled with the enhanced reality headset.

2. The computer-implemented method of claim 1, wherein identifying the scenario to switch the configuration comprises capturing an image of an environment of the user of the enhanced reality headset and identifying a potential hazard to the user from the image of the environment.

3. The computer-implemented method of claim 1, wherein identifying the scenario to switch the configuration comprises capturing an audio of an environment of the user of the enhanced reality headset and identifying an alert to the user from the audio of the environment.

4. The computer-implemented method of claim 1, wherein identifying the scenario to switch the configuration comprises determining that a period of time has lapsed without an alert or a potential hazard to the user has been identified.

5. The computer-implemented method of claim 1, wherein the enhanced reality headset comprises multiple inertial motion sensors, and identifying a scenario to switch a configuration of an enhanced reality headset comprises identifying a signal pattern from the inertial motion sensors, the signal pattern being indicative of a potential hazard to the user.

6. The computer-implemented method of claim 1, wherein providing the indication of the intent to switch the configuration comprises providing, for the user, a through-video image in a portion of a display in the enhanced reality headset.

7. The computer-implemented method of claim 1, further comprising receiving, from the user, a validation of the intent to switch the configuration of the enhanced reality headset.

8. The computer-implemented method of claim 1, wherein the enhanced reality headset is configured to provide a through-video image in a portion of a display for the user, and a button for the user to select between the virtual reality configuration, and the augmented reality configuration, the method further comprising switching the enhanced reality headset per a user selection of the button.

9. The computer-implemented method of claim 1, further comprising providing, to a remote device communicatively coupled with the enhanced reality headset, an indication that the configuration of the enhanced reality headset has been switched.

10. The computer-implemented method of claim 1, wherein the configuration is switched to the virtual reality configuration.

11. A system, comprising:
one or more processors; and
a memory storing instructions which, when executed by the one or more processors, cause the system to:
identify a scenario to switch a configuration of an enhanced reality headset between a virtual reality configuration and an augmented reality configuration, wherein the virtual reality configuration and the augmented reality configuration include a computer generated image, and the augmented reality configuration includes a real-time image of an environment of a user of the enhanced reality headset;
provide, the user of the enhanced reality headset, an indication of an intent to switch the configuration of the enhanced reality headset;
switch the configuration of the enhanced reality headset according to the scenario; and
in response to the switch of the configuration, provide an avatar of the user to a remote device communicatively coupled with the enhanced reality headset.

12. The system of claim 11, wherein, to identify the scenario to switch the configuration, the instructions, when executed by the one or more processors, cause the system to capture an audio of an environment of the user of the enhanced reality headset and identify an alert to the user from the audio of the environment.

13. The system of claim 11 wherein, to identify the scenario to switch the configuration, the instructions, when executed by the one or more processors, cause the system to capture an image of an environment of the user of the enhanced reality headset and identify a potential hazard to the user from the image of the environment.

14. The system of claim 11 wherein the instructions, when executed by the one or more processors, cause the system to:
provide, to a remote device communicatively coupled with the enhanced reality headset, an indication that the configuration of the enhanced reality headset has been switched.

15. The system of claim 11 wherein, to provide the indication of the intent to switch the configuration, the instructions, when executed by the one or more processors, cause the system to provide, for the user, a through-video image in a portion of a display in the enhanced reality headset.

16. A non-transitory, computer-readable medium storing instructions which, when executed by a processor, cause a computer to:
identify a scenario to switch a configuration of an enhanced reality headset between a virtual reality configuration and an augmented reality configuration, wherein the virtual reality configuration and the augmented reality configuration include a computer generated image, and the augmented reality configuration includes a real-time image of an environment of a user of the enhanced reality headset;
provide, to a user of the enhanced reality headset, an indication of an intent to switch the configuration of the enhanced reality headset;
switch the configuration of the enhanced reality headset according to the scenario; and
in response to the switch of the configuration, provide an avatar of the user to a remote device communicatively coupled with the enhanced reality headset.

17. The non-transitory, computer-readable medium of claim 16 wherein, to identify the scenario to switch the configuration, the instructions, when executed by the processor, cause the computer to capture an image of an environment of the user of the enhanced reality headset and identify a potential hazard to the user from the image of the environment.

18. The non-transitory, computer-readable medium of claim 16 wherein, to identify the scenario to switch the configuration, the instructions, when executed by the processor, cause the computer to capture an audio of an environment of the user of the enhanced reality headset and identify an alert to the user from the audio of the environment.

19. The non-transitory, computer-readable medium of claim 16 wherein, to provide the indication of the intent to switch the configuration, the instructions, when executed by the processor, cause the computer to provide, for the user, a through-video image in a portion of a display in the enhanced reality headset.

20. The non-transitory, computer-readable medium of claim 16 wherein the instructions, when executed by the processor, cause the computer to:
provide, to a remote device communicatively coupled with the enhanced reality headset, an indication that the configuration of the enhanced reality headset has been switched.

\* \* \* \* \*